US012009696B2

United States Patent
Pal et al.

(10) Patent No.: US 12,009,696 B2
(45) Date of Patent: Jun. 11, 2024

(54) TWO PHASE COOLING FOR ELECTRIC MACHINE

(71) Applicant: Hamilton Sundstrand Corporation, Charlotte, NC (US)

(72) Inventors: Debabrata Pal, Hoffman Estates, IL (US); Joseph Kenneth Coldwate, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 78 days.

(21) Appl. No.: 17/328,945

(22) Filed: May 24, 2021

(65) Prior Publication Data
US 2022/0376566 A1  Nov. 24, 2022

(51) Int. Cl.
| H02K 1/20 | (2006.01) |
| H02K 5/18 | (2006.01) |
| H02K 9/20 | (2006.01) |
| H02K 21/14 | (2006.01) |

(52) U.S. Cl.
CPC ............. *H02K 1/20* (2013.01); *H02K 5/18* (2013.01); *H02K 9/20* (2013.01); *H02K 21/14* (2013.01)

(58) Field of Classification Search
CPC ........... H02K 1/20; H02K 9/19; H02K 9/193; H02K 9/197; H02K 9/20; H02K 5/18; H02K 5/20; H02K 21/14
USPC ............................................. 310/54, 58, 59
See application file for complete search history.

(56) References Cited

U.S. PATENT DOCUMENTS

| 3,675,056 | A | * | 7/1972 | Lenz | H02K 9/20 310/59 |
| 5,122,704 | A | * | 6/1992 | Blakeley | H02K 3/46 310/43 |
| 5,866,959 | A | * | 2/1999 | Le Flem | H02K 1/20 310/216.071 |
| 7,633,193 | B2 | | 12/2009 | Masoudipour et al. | |
| 8,970,075 | B2 | | 3/2015 | Rippel et al. | |
| 9,461,523 | B2 | | 10/2016 | Shoykhet | |
| 2008/0168796 | A1 | * | 7/2008 | Masoudipour | H02K 9/197 62/505 |
| 2016/0156251 | A1 | * | 6/2016 | Sakurai | H02K 9/197 310/58 |
| 2017/0133912 | A1 | * | 5/2017 | Gi | H02K 7/003 |
| 2019/0020231 | A1 | * | 1/2019 | Dlala | H02K 1/02 |
| 2019/0074749 | A1 | * | 3/2019 | Snell | H02K 5/124 |

(Continued)

FOREIGN PATENT DOCUMENTS

| CN | 110707843 A | 1/2020 |
| DE | 3528347 A1 | 2/1987 |
| EP | 2575237 A2 | 4/2013 |

(Continued)

OTHER PUBLICATIONS

Extended European Search Report for European Patent Application No. EP22175208.2, dated Oct. 17, 2022.

*Primary Examiner* — Michael Andrews

(57) ABSTRACT

A system comprises a stator core defining a plurality of winding slots between circumferentially spaced apart teeth. A respective cooling channel is defined within each of the circumferentially spaced apart teeth for circulation of coolant fluid through the stator core. The stator core is a laminated structure, where the teeth, winding slots, and cooling channels are part of a common laminated structure with the stator core.

19 Claims, 7 Drawing Sheets

(56) References Cited

U.S. PATENT DOCUMENTS

2019/0296613 A1* 9/2019 Takashima ............. H02K 7/116
2020/0328655 A1 10/2020 Nino Baron et al.

FOREIGN PATENT DOCUMENTS

EP 3553920 A1 10/2019
GB 1354247 A 6/1974

* cited by examiner

TWO PHASE COOLING FOR ELECTRIC MACHINE

BACKGROUND

1. Field

The present disclosure relates to electric machines such as electric motors, generators and motor-generators, and more particularly to cooling electric machines.

2. Description of Related Art

There is an ongoing need to improve power density in electric machines such as electric motors and generators. Increased power density leads to increased need for heat removal by cooling. Traditional techniques for cooling electric machines have been considered adequate for their intended purposes, but as the trend continues for more and more power-dense electric machines, there is an ongoing need for improved ways of cooling electric machines. This disclosure provides solutions for this need.

The conventional techniques have been considered satisfactory for their intended purpose. However, there is an ever-present need for improved systems and methods for cooling electric machines. This disclosure provides a solution for this need.

SUMMARY

A system comprises a stator core defining a plurality of winding slots between circumferentially spaced apart teeth. A respective cooling channel is defined within each of the circumferentially spaced apart teeth for circulation of coolant fluid through the stator core. The stator core is a laminated structure, where the teeth, winding slots, and cooling channels are part of a common laminated structure within the stator core.

The stator core is part of a stator. A rotor is mounted within the stator for rotary movement relative to the stator. Each tooth includes a pair of circumferentially spaced apart walls, and wherein the respective cooling channel of each tooth is defined within the tooth between the pair of circumferentially spaced apart walls for fluid isolation of the respective cooling channel and circumferentially adjacent ones of the winding slots.

The pair of circumferentially spaced apart walls of each tooth are not parallel, giving each tooth a trapezoidal axial cross-sectional shape, and wherein the respective cooling channel is triangular. A first cooling channel wall is parallel to a first one of the pair of circumferentially space apart walls of the tooth, and a second cooling channel wall is parallel to a second one of the pair of circumferentially spaced apart walls of the tooth.

Each respective cooling channel includes a base wall that is circumferentially aligned with a base wall of each circumferentially adjacent one of the plurality of winding slots. Each respective cooling channel has a constant cross-sectional size and shape in each layer of the common laminated structure. At least one winding phase is seated in each winding slot.

A rotor shaft disposed within the rotor for driving an environmental control system (ECS) compressor, such that the rotor rotates about the shaft. An insulator is sealed to an inner diameter of the stator, defining an air gap barrier between the rotor and the shaft and bounding an inner portion of the cooling channel. Coolant flow through the respective cooling channel of each tooth defines a first coolant flow path, and further comprising a shaft cooling channel defined through the shaft defining a second coolant flow path. At least one air bearing can be disposed on the shaft. A sleeve can be disposed on an outer diameter of the rotor.

In certain embodiments, a plurality of fins disposed in each respective cooling channel of the teeth. In certain embodiments, the respective cooling channel of each tooth includes a plurality of cooling channels defined in each tooth, wherein the plurality of cooling channels are parallel to and distributed about an outer perimeter of an adjacent winding slot, wherein coolant enters the cooling channel through a radial bore in the stator.

In embodiments, the respective cooling channels are fed by a coolant loop, and further comprising a pump in the coolant loop in fluid communication with the cooling channel, upstream of the motor relative to coolant flow. A condenser in disposed in the coolant loop in fluid communication with the cooling channel upstream of the pump relative to coolant flow, wherein the cooling channel forms an evaporator for two-phase cooling in the motor.

In certain embodiments, an environmental control system (ECS) heat exchanger can be disposed in the coolant loop fluid communication with the condenser. In certain embodiments, an ECS condenser can be disposed in the ECS heat exchanger, and an ECS ram air flow air mover can be included external to the coolant loop at a downstream side of the ECS heat exchanger, relative to ram air flow.

A method comprises evaporating coolant in cooling channels in a stator core of an electric machine. The stator core can define a plurality of winding slots between circumferentially spaced apart teeth, where the cooling channels are defined within each of the circumferentially spaced apart teeth, and such that the stator core is a laminated structure, wherein the teeth, winding slots, and cooling channels are part of a common laminated structure with the stator core.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
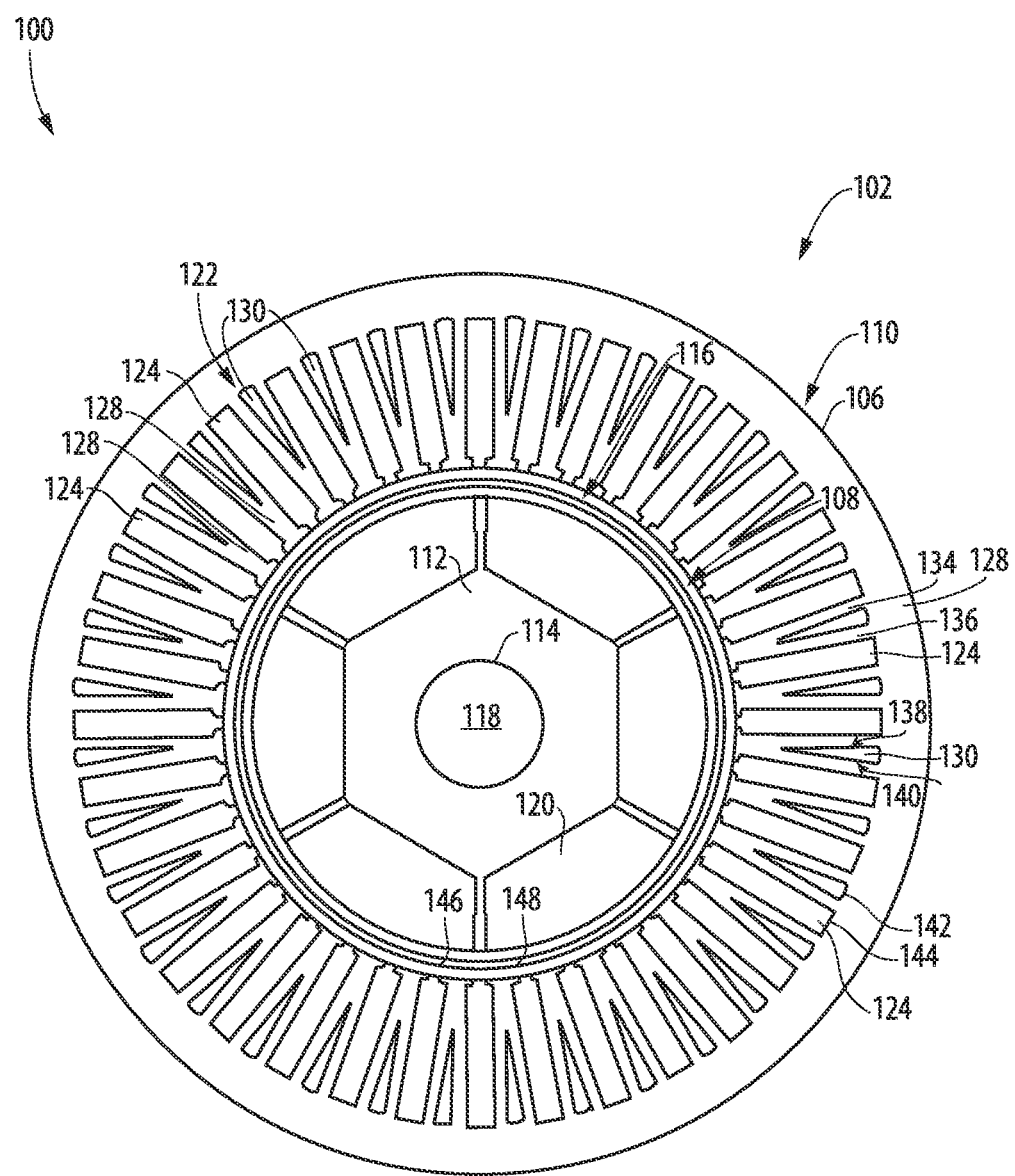
FIG. 1 is a schematic perspective view of an embodiment of an electric machine constructed in accordance with the present disclosure, showing a stator core having a plurality of cooling channels.
Figure 2A:
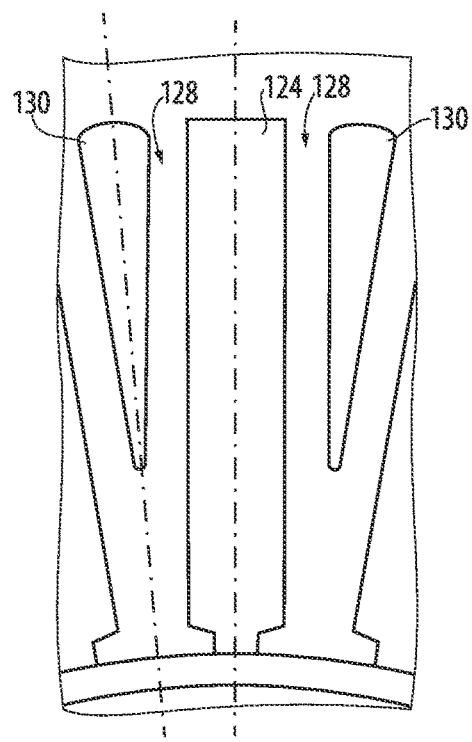
FIG. 2A is an enlarged view of an embodiment of the stator core of FIG. 1.
Figure 2B:
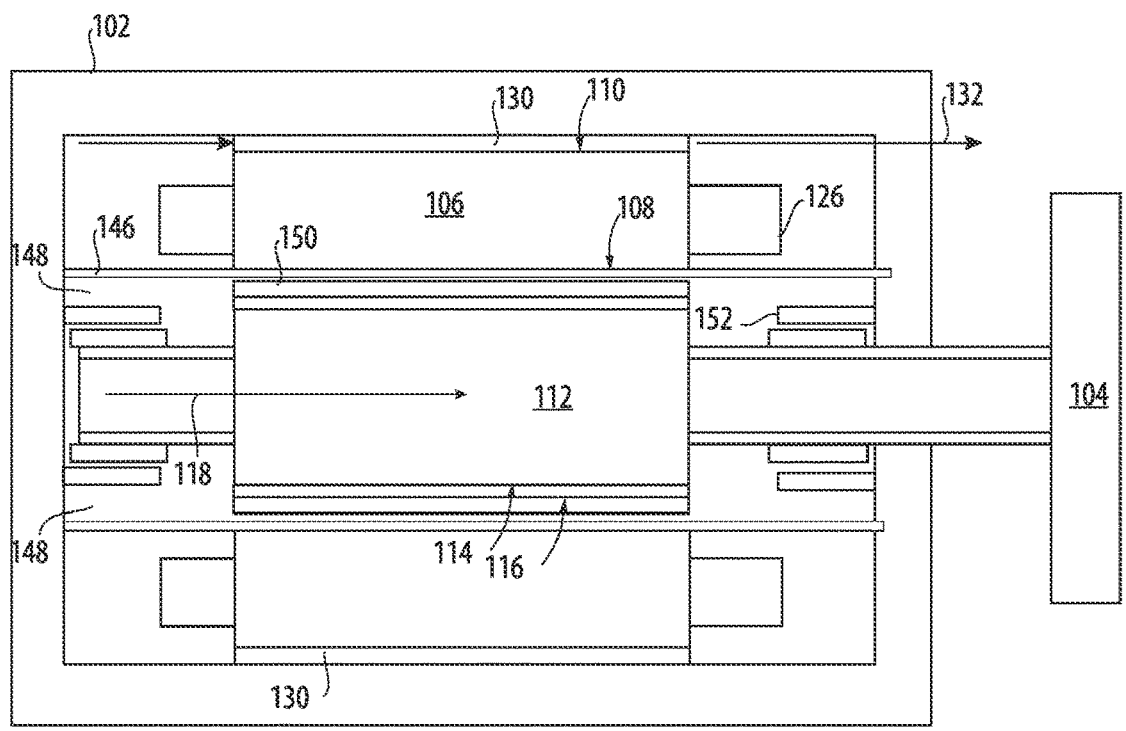
FIG. 2B is a cross section side view of the electric machine of FIGS. 1-2A.
Figure 3A:
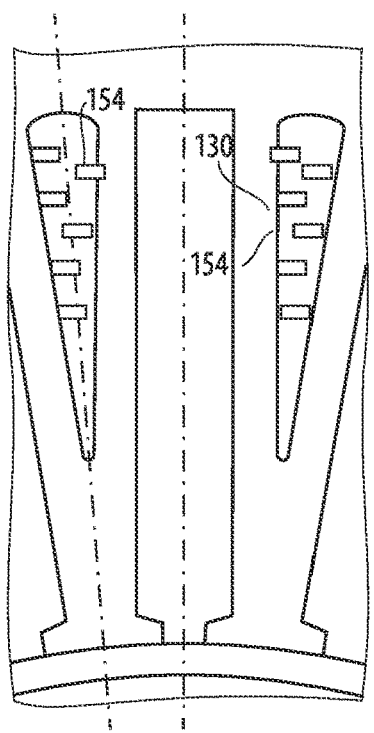
FIG. 3A is an enlarged view of another embodiment of the stator core of FIG. 1.
Figure 3B:
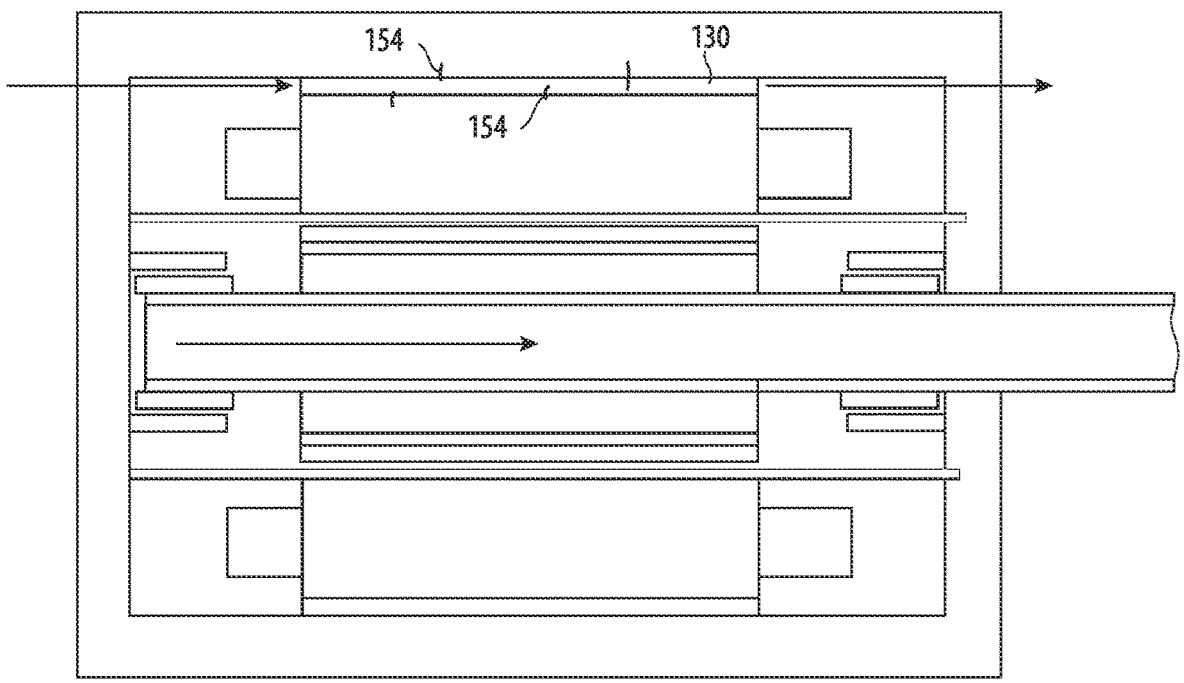
FIG. 3B is a cross section side view of the electric machine of FIG. 3A.
Figure 4A:
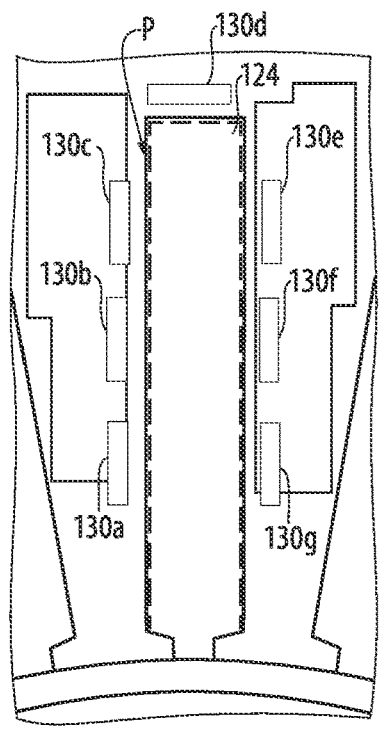
FIG. 4A is an enlarged view of another embodiment of stator core of FIG. 1.
Figure 4B:
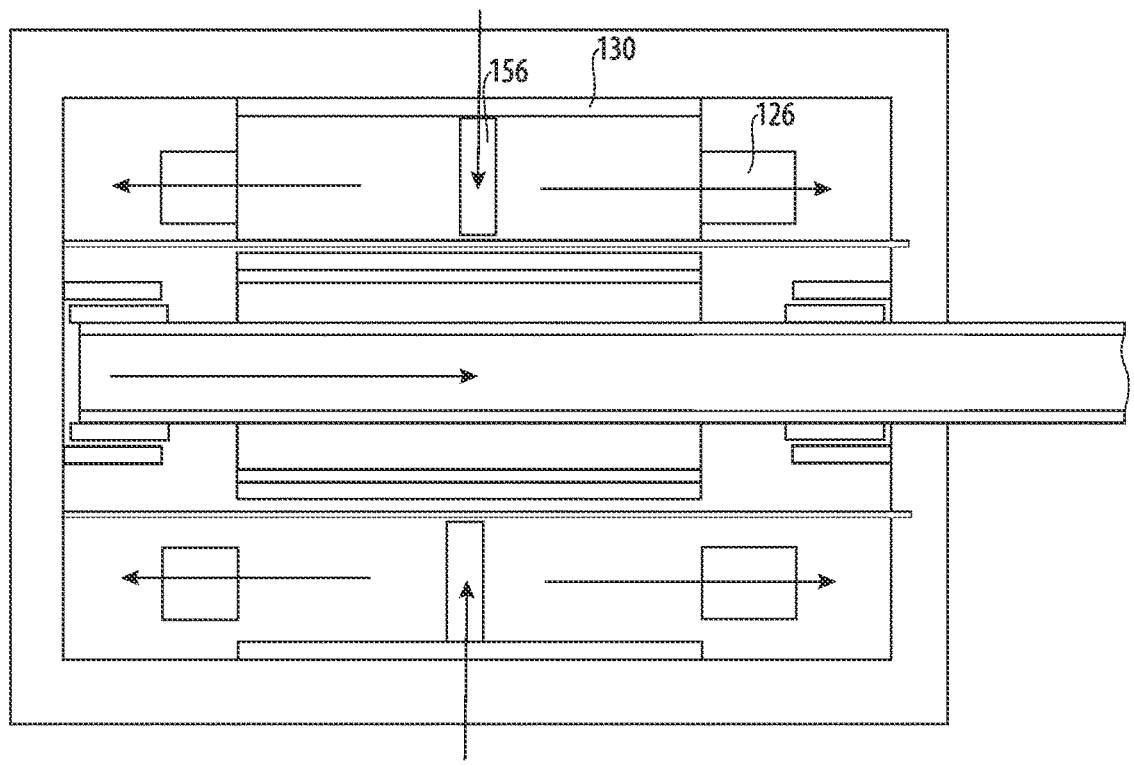
FIG. 4B is a cross section side view of the electric machine of FIG. 4A.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to improve cooling an efficiency of electric machines.

As electric propulsion and electric aircraft advance, high power motors are often required for electric environmental control systems (ECS) or electric propulsion applications. But compact high-power motors (e.g. 30-50 krpm and 300-1000 kW) can have high heat density, not easily cooled by traditional back iron oil jacket cooling or back iron and end winding air cooling. The system 100 as described herein provides an alternative method for cooling a high power motor 102, for example using two phase cooling without the need for jacket cooling around the outer diameter of the stator.

The system 100 comprises the motor 102, for driving an ECS compressor 104, for example. The motor 102 includes a stator 106 having an inner diameter 108 and an outer diameter 110, and a rotor 112 having an inner diameter 114 and an outer diameter 116. The rotor 112 is mounted to a rotor shaft (e.g. a hollow shaft) for rotational movement relative to the stator 106 with the rotor shaft 118. The rotor includes a plurality of magnets 120 disposed therein, for example any suitable permanent magnets (e.g. bread loaf magnets).

The stator 106 includes a stator core 122 defining a plurality of winding slots 124 configured to house a respective winding 126, the winding slots 124 defined between circumferentially spaced apart teeth 128. A respective cooling channel 130 is defined within each of the circumferentially spaced apart teeth 128 for circulation of coolant fluid 132 through the stator core 122. The stator core 122 can be a laminated structure, where the teeth 128, winding slots 124, and cooling channels 130 are part of a common laminated structure with the stator core 122, for example.

Each tooth 128 includes a pair of circumferentially spaced apart walls 134, 136, such that the respective cooling channel 130 of each tooth is defined within the tooth 128 between the pair of circumferentially spaced apart walls 134, 136. In this manner, the cooling channels 130 and adjacent winding slots 124 are fluidly isolated from one another. As shown, the pair of circumferentially spaced apart walls 134, 136 of each tooth 128 need not be parallel, thereby giving each tooth 128 a trapezoidal axial cross-sectional shape and each respective cooling channel 130 a triangular axial cross-sectional shape.

Each cooling channel 130 includes a first cooling channel wall 138, parallel to a first one of the pair of circumferentially space apart walls 134 of the tooth 128, and a second cooling channel wall 140, parallel to a second one of the pair of circumferentially spaced apart walls 136 of the tooth 128. A base wall 142 of each cooling channel is circumferentially aligned with a base wall 144 of each circumferentially adjacent one of the plurality of winding slots 124. Each respective cooling channel 130 has a constant cross-sectional size and shape in each layer of the common laminated structure, for example as shown.

An insulator 146 is sealingly engaged to the inner diameter 108 of the stator 106 (e.g. using adhesive), defining an air gap barrier 148 between the stator 106 and a sleeve 150 on an the outer diameter 116 of the rotor 112 so that coolant is prohibited from flowing from the stator 106 to the rotor 112. In certain embodiments, such as in FIG. 2B, at least one air bearing 152 can be mounted on the shaft 118. In certain embodiments, such as in FIGS. 3A-3B, a plurality of fins 154 can be disposed in each respective cooling channel 130 to increase the total surface area of heat transfer within the cooling channel. In certain embodiments, such as in FIGS. 4A-4B, the respective cooling channel 130 of each tooth can be a plurality of cooling channels 130a-c defined in each tooth 128. In this example, the plurality of cooling channels 130a-g are parallel to and distributed around an outer perimeter P of an adjacent winding slot 124. In this case, coolant enters from a radial channel 156 in the stator 106, to bring coolant from outside the motor 102 to inside the motor 102 and through the coolant channels 130. This configuration provides for more intimate thermal conduction between the windings 126 and coolant 132.

Figure 5:
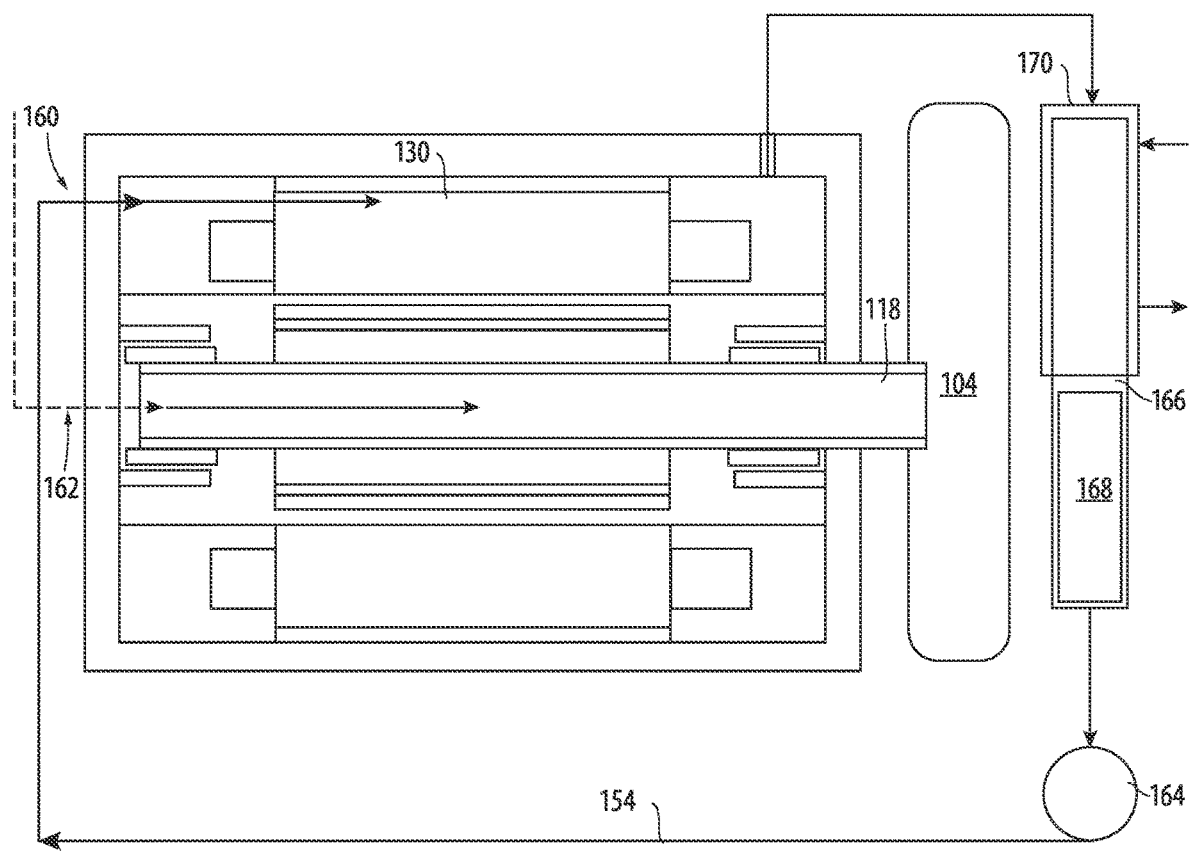
FIG. 5 is a schematic diagram of a fluid circuit, showing a flow of a coolant loop through the cooling channels of FIGS. 1-4B.
Figure 6:
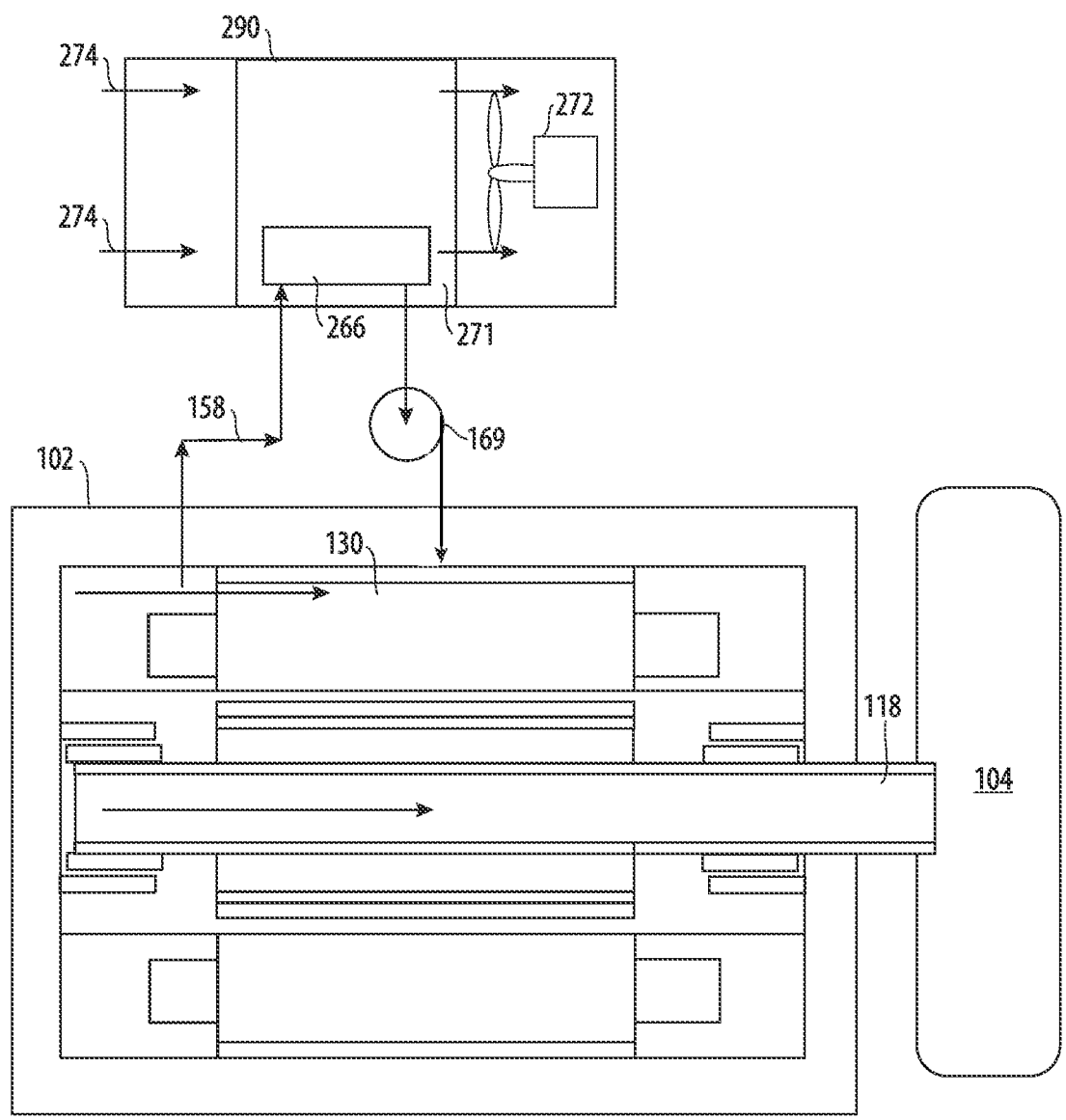
FIG. 6 is a schematic diagram of another fluid circuit, showing a flow of a coolant loop through the cooling channels of FIGS. 1-4B.
Figure 7:
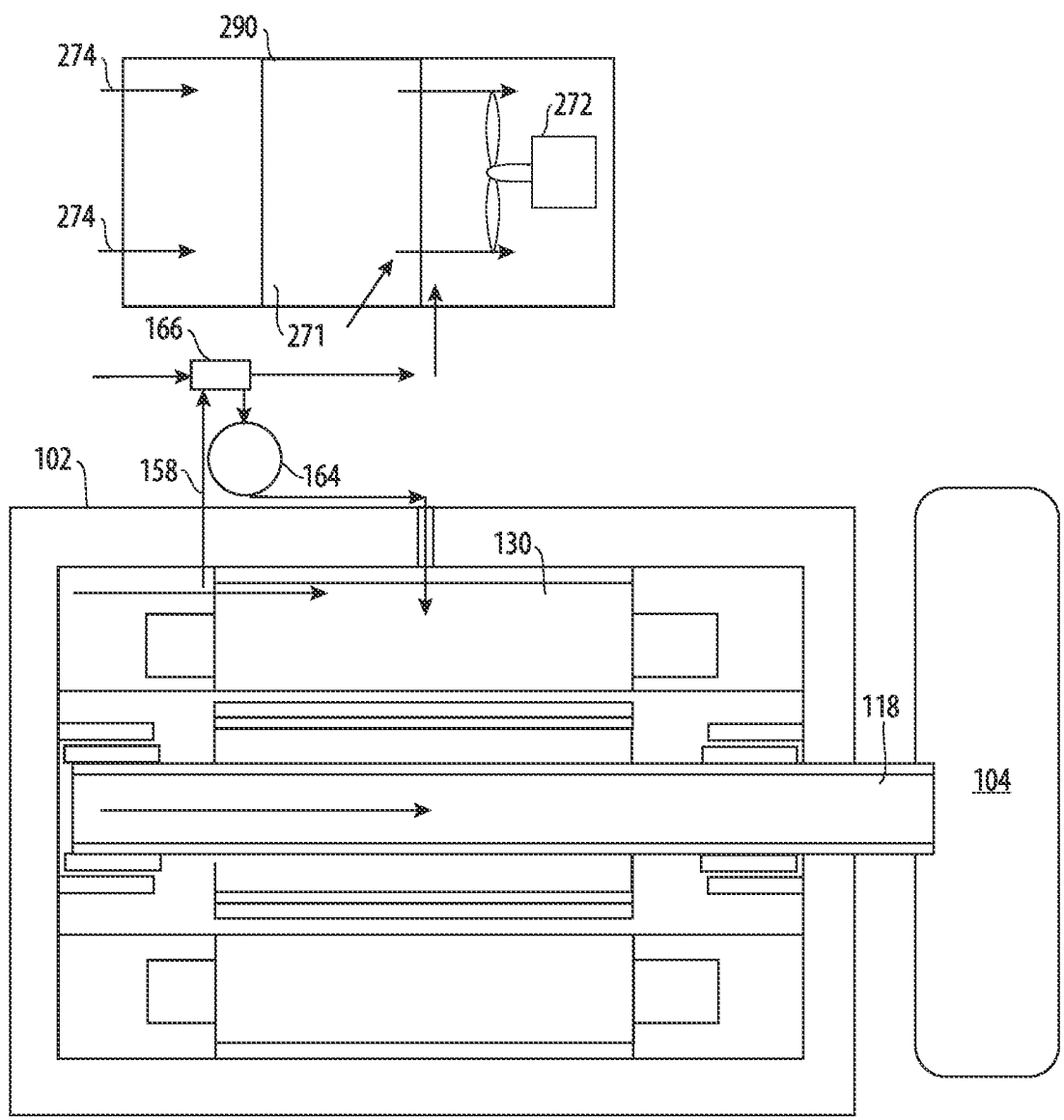
FIG. 7 is a schematic diagram of yet another fluid circuit, showing a flow of a coolant loop through the cooling channels of FIGS. 1-4B.

In embodiments, for example as shown in FIGS. 5-7, the respective cooling channels 130 are fed by a coolant loop 158. A first coolant flow path 160 flows to the respective cooling channels 130, and a second coolant flow path flows to the hollow core of the rotor shaft 118. The first and second coolant flow paths 160, 162 can be fed by the same coolant loop 158, or by different coolant loops. The coolant 132 can be any suitable fluid, for example any suitable two phase fluid that that has a high capacity for heat absorption relative to volume, or high latent heat of evaporation, such that a smaller amount of coolant can be used to absorb high large amounts of heat. The coolant can be a non-conductive, or dielectric coolant, such as flurorinert.

A pump 164 is disposed in the coolant loop 158 in fluid communication with the cooling channel 130, directly upstream of the motor 102 relative to coolant flow, to pump coolant flow from a condenser 166 to the cooling channels 130. The condenser 166 is in disposed in the coolant loop 158 upstream of the pump 164 relative to coolant flow. The condenser 166 and associated tank 168 house the coolant 132 in liquid phase for pumping to cooling channels 130, where the cooling channel forms 130 an evaporator for two-phase cooling in the motor 102. A heat exchanger 170 can be disposed in the coolant loop 158 in fluid communication with the condenser 166 for cooling the coolant.

In certain embodiments, such as in FIG. 6, the heat exchanger can be an existing ECS ram air heat exchanger 270, taking advantage of the existing volume 271, without the need for an additional heat exchanger. An ECS ram air flow air mover 272 can be included external to the coolant loop 158 at a downstream side of the ECS heat exchanger 270, relative to ram air flow 247, for drawing the hot ram air away from the coolant loop 158. In certain embodiments, an ECS condenser 266 can be disposed within am ECS heat exchanger (e.g. as shown in FIG. 6), or a separate condenser 166 can be used, outside of the existing ram air volume 271 (e.g. as shown in FIG. 7).

A method comprises evaporating the coolant 132 within the cooling channels 130 of the stator core 122 of an electric machine 102. The methods and systems of the present disclosure, as described above and shown in the drawings, provide for a more compact motor, reducing weight and volume of the overall system. Further, two phase cooling provide acceptable temperatures for higher rotor speeds, and thus increased motor reliability.

While the apparatus and methods of the subject disclosure have been shown and described, those skilled in the art will readily appreciate that changes and/or modifications may be made thereto without departing from the scope of the subject disclosure.

What is claimed is:

1. A system comprising:
a stator core defining a plurality of winding slots between circumferentially spaced apart teeth wherein each winding slot is defined by a first side wall, a second side wall circumferentially spaced across the winding slot from the first side wall, and an end wall radially outboard of the first and second side walls, wherein a plurality of cooling channels are defined within each of the circumferentially spaced apart teeth about an outer perimeter of each winding slot for circulation of coolant fluid through the stator core, and wherein the stator core is a laminated structure, wherein the teeth, winding slots, and cooling channels are part of a common laminated structure with the stator core,
wherein the plurality of cooling channels for each respective winding slot includes at least one cooling channel outboard of the first side wall, at least one cooling channel outboard of the second side wall, and at least one cooling channel outboard of the end wall such that the plurality of cooling channels for each respective winding slot surround the respective winding slot.

2. The system as recited in claim 1, wherein the stator core is part of a stator, and further comprising a rotor mounted within the stator for rotary movement relative to the stator.

3. The system as recited in claim 1, wherein each tooth of the circumferentially spaced apart teeth is defined by a pair of circumferentially spaced apart tooth walls, wherein the pair of circumferentially spaced apart tooth walls are not parallel, giving each tooth a trapezoidal axial cross-sectional shape.

4. The system as recited in claim 1, wherein each respective cooling channel has a constant cross-sectional size and shape in each layer of the common laminated structure.

5. The system as recited in claim 1, further comprising at least one winding phase seated in each winding slot.

6. The system of claim 2, further comprising a rotor shaft disposed within the rotor for driving an environmental control system (ECS) compressor such that the rotor rotates about the shaft.

7. The system as recited in claim 6, further comprising an insulator sealed to an inner diameter of the stator, defining an air gap barrier between the rotor and the shaft and bounding an inner portion of the cooling channels.

8. The system as recited in claim 6, wherein coolant flow through the respective cooling channel of each tooth defines a first coolant flow path, and further comprising a shaft cooling channel defined through the shaft defining a second coolant flow path.

9. The system of claim 6, further comprising at least one air bearing disposed on the shaft.

10. The system as recited in claim 6, further comprising a sleeve disposed on an outer diameter of the rotor.

11. The system as recited in claim 1, wherein the stator core forms a part of a stator of a motor, the motor disposed in a coolant loop such that the respective cooling channels are fed by the coolant loop, and further comprising a pump in the coolant loop in fluid communication with the respective cooling channels, upstream of the motor relative to coolant flow.

12. The system as recited in claim 11, wherein the respective cooling channels form an evaporator for two-phase cooling in the motor.

13. The system as recited in claim 12, further comprising: an environmental control system (ECS) ram air flow air mover external to the coolant loop at a downstream end of an ECS heat exchanger, relative to ram air flow.

14. The system of claim 1, wherein the plurality of cooling channels for each respective winding slot includes three cooling channels outboard of the first side wall, three cooling channels outboard of the second side wall, and at least one cooling channel outboard of the end wall such that the plurality of cooling channels for each respective winding slot surround the respective winding slot.

15. A stator core, comprising:
a yoke defining a central axis;
a winding slot defined in the yoke having a first side wall, a second side wall parallel to the first side wall, and an end wall extending between the first side wall and the second side wall radially outboard of the first and second side walls; and
a plurality of cooling channels defined in the yoke configured to pass a cooling fluid through the stator core, wherein the plurality of cooling channels are defined about a perimeter of the winding slot such that a first cooling channel is defined in the yoke adjacent to the first side wall closer to the first side wall than to an adjacent winding slot, a second cooling channel is defined in the yoke adjacent the second side wall closer to the second side wall than to an adjacent winding slot, and a third cooling channel is defined in the yoke adjacent the end wall closer to the end wall than to an outer diameter of the yoke.

16. The stator core of claim 15, further comprising a plurality of winding slots defined in the yoke circumferentially spaced apart from one another, wherein a plurality of cooling channels for each respective winding slot includes three cooling channels outboard of the first side wall, three cooling channels outboard of the second side wall, and at least one cooling channel outboard of the end wall such that the plurality of cooling channels for each respective winding slot surround the respective winding slot.

17. An environmental control system comprising:
a motor, the motor including a stator having a plurality of winding slots defined therein and a plurality of cooling channels defined therein configured to provide a cooling fluid therethrough to cool the plurality of winding slots;
a cabin air compressor operatively connected to the motor to be driven by the motor, the cabin air compressor configured to supply a compressed airflow to a vehicle cabin; and
a refrigeration circuit in fluid communication with the plurality of cooling channels of the motor to circulate the cooling fluid to the plurality of cooling channels to cool the motor, wherein the refrigeration circuit comprises:
a condenser configured to receive evaporated cooling fluid from the motor and condense the cooling fluid;

a ram air heat exchanger in fluid communication with a ram air flow to receive the ram air flow, wherein the heat exchanger is in thermal communication with the condenser such that the ram air flow receives heat from the cooling fluid in the condenser to condense the cooling fluid; and a pump downstream of the condenser configured to receive the cooling fluid from the condenser and supply the cooling fluid to the plurality of cooling channels of the motor, wherein the pump is disposed in the refrigeration circuit between the condenser and the motor, wherein the plurality of cooling channels of the motor are configured to act as an evaporator of the refrigeration circuit;

wherein the stator includes a yoke defining a central axis;

wherein each winding slot of the plurality of winding slots is defined in the yoke and has a first side wall, a second side wall parallel to the first side wall, and an end wall extending between the first side wall and the second side wall; and wherein the plurality of cooling channels are defined about a perimeter of each winding slot of the plurality of winding slots such that, for each winding slot, a first cooling channel is defined in the yoke adjacent to the first side wall closer to the first side wall than an adjacent winding slot, a second cooling channel is defined in the yoke adjacent the second side wall closer to the second side wall than an adjacent winding slot, and a third cooling channel is defined in the yoke adjacent the end wall closer to the end wall than to an outer diameter of the yoke.

18. The environmental control system of claim 17, wherein the condenser is within the ram air heat exchanger.

19. The environmental control system of claim 17, wherein the condenser is outside of the ram air heat exchanger.

* * * * *